Oct. 4, 1949.  T. BAILEY  2,483,870
INSULATED NURSING BOTTLE
Filed Nov. 15, 1945

INVENTOR.
Theodore Bailey
BY Victor J. Evans & Co.
ATTORNEYS

Patented Oct. 4, 1949

2,483,870

UNITED STATES PATENT OFFICE 2,483,870

INSULATED NURSING BOTTLE

Theodore Bailey, Habana, Cuba

Application November 15, 1945, Serial No. 628,704

1 Claim. (Cl. 215—11)

My present invention, in its broad aspect, has reference to improvements in infant nursing bottles and nipples, whereby the bottle is semi-insulated, the contents fully sealed, the nipple most efficient and satisfactory to the infant and the bottle formed to prevent rolling on smooth flat surfaces.

More particularly, it is my purpose to provide an improved bottle and nipple which may be kept in a sanitary and clean condition and which will maintain the warmth of the milk for use by the infant at such times as the infant may desire. Furthermore, the parts are simple and practical and easily cleaned, and the contents of the bottle is sealed against leakage and means provided for guarding the nipple from contamination by dirt, flies and insects, until used. The nipple on the other hand is constructed to simulate a mother's breast and normal and natural nursing conditions, and means are provided for preventing accidental dislodgement or removal or derangement of parts by the infant.

Other and equally important objects and advantages of my invention will be apparent from the following detailed description taken in connection with the accompanying drawings, but changes may be made in general construction and arrangement of parts provided same fall within the purview of my inventive concept and the scope of the appended claim.

In the drawings wherein I have illustrated my invention:

In the drawings wherein like characters of reference are used to designate like or similar parts throughout the several views.

Figure 1:
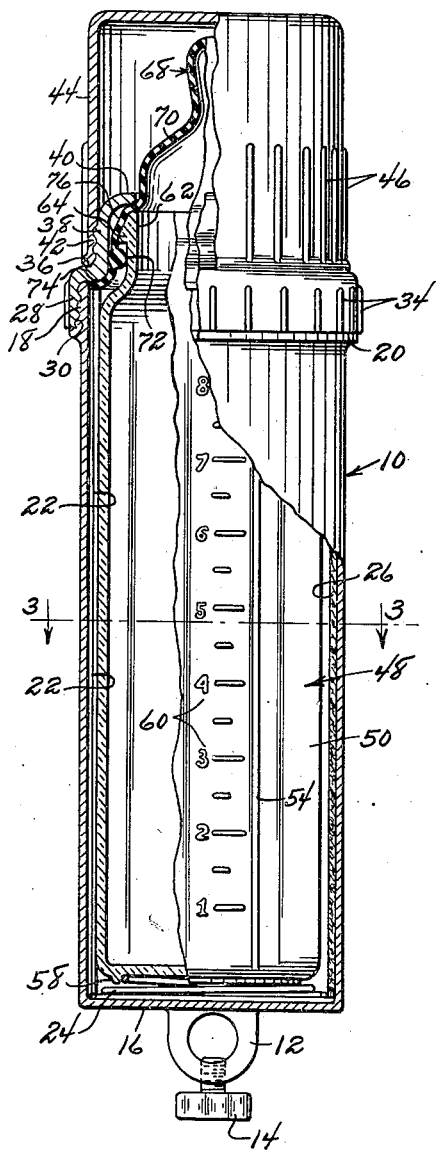
Figure 1 is a vertical elevation, partly broken away, of the nursing bottle, bottle holder, nipple and cap embodying the invention.
Figure 2:
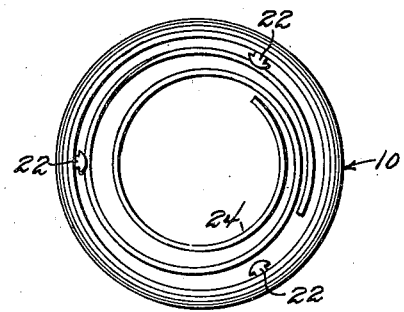
Figure 2 is a plan view looking down at the bottom of the holder and shows the spring

The numeral 10 designates my bottle holder or outer casing which is provided with a collar 12 for connection to a suitable support not shown. A thumb screw 14 carried by the collar engages the support to maintain the holder 10 in adjusted position. The holder 10 may be formed of any suitable material and is hollow and elongated and circular in cross section and has a base 16 to which the collar is attached and an exteriorly threaded upper edge 18, with the stop rib 20. The length of the holder is the length of 8 oz. nursing bottle, and its diameter is appreciably larger than the diameter of a nursing bottle, to provide an insulating air space between a bottle and the holder.

On the interior wall of the holder at uniformly spaced points are longitudinal ribs 22 which are T-shaped in cross section to provide heads, and on the bottom of the holder is a coil spring 24. Sheets of insulating material 26 may be placed in the holder.

At the top of the holder is an annular collar 28, internally screw-threaded as at 30 to engage screw threads 18 and having spaced external ribs 34 to provide a finger grip. The collar is turned inwardly at right-angles to form a shoulder 36 and is then turned upwardly to form a restricted annular neck 38 with an inwardly curved lip or rim 40 at its upper edge. The neck is screw-threaded at 42 to receive the cylindrical cap 44. The cap has a flat top and spaced ribs 46 to provide a hand grip. It will be noted that the diameter of the cap is substantially the same as the diameter of the body of the holder.

My nursing bottle 48 has a polygonally shaped body 50 so that it will not roll off of a smooth flat surface such as a table top. Its diameter is less than that of the interior of the holder to provide an insulating air space 52 and longitudinal grooves 54 to slidably engage the T-shaped ribs 22 in the holder so that the bottle is supported firmly in spaced relationship to the holder, with its bottom 56 resting on the spring 24. An annular rib 58 on the bottom engages the spring to properly mount the bottle in the holder in spaced relationship to the bottom of the holder. The bottle has a series of graduations 60 indicating ounces of contents.

The bottle has a restricted annular neck 62 with an enlarged portion forming a lip 64 and the size and position of the neck 62 is such that it is positioned directly below and under the curved lip 40.

My nipple 68 has a cylindrical, soft rubber body part 70 which is pleasant to the mouth of an infant, and an enlarged annular bead 72 for engagement beneath the lip 64 to hold the nipple securely on the bottle. An annular, lateral extension or skirt 74 of the nipple extends over and seats against the side of the holder as shown in Figure 1, and the portion 76 of the nipple above the rib is clamped by the curved lip 40 against the top edge of the bottle when the bottle is in the holder to seal the bottle and nipple. The threads on the cap, collar and holder may be reversed to prevent manipulation thereof to remove the bottle from the holder by an infant at play or in nursing.

Figure 3:
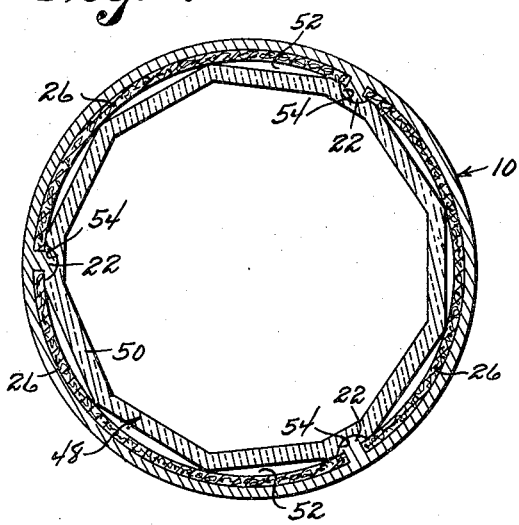
Figure 3 is a transverse enlarged section on the line 3—3 of Figure 1.
Figure 4:
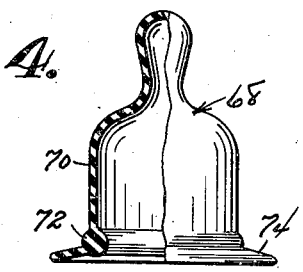
Figure 4 is a side view of the nipple per se partly in section.

As shown in Figure 3, the facets of the bottle are not all of the same width; those having the grooves 54 being narrower than the rest for purpose of strength.

It is believed that the operation and advantages of my invention will be apparent from the foregoing, but it is again emphasized that interpretation of the scope of my invention should only be conclusive when made in the light of the subjoined claim.

I claim:

In a nursing bottle, the combination, which comprises, a wide-mouth bottle having a neck of a diameter smaller than that of the body portion of the bottle and having a circumferential bead with a conical-shaped outer surface at the end of the neck, the inner end of said bead forming a shoulder, a nipple having a relatively large body portion with an enlarged circumferential bead at the open end of said body portion and having an outwardly flared skirt extending from said bead for locating the bottle in assembling, said nipple positioned with the circumferential bead thereof stretched over the bead at the end of the neck of the bottle and secured under the shoulder thereof, an outer casing spaced from said bottle having threads on the outer surface of the end thereof, a sheet of insulating material providing an inner lining for the outer casing, a coil spring in the lower end of the outer casing resiliently urging the bottle outwardly therefrom, an annular collar threaded on the threads of said outer casing having an inner annular rim positioned to engage the skirt of the nipple and having an externally threaded section of reduced diameter with an inwardly extending annular rim at the end thereof positioned to hold the nipple against the end of the neck of the bottle coacting with the spring in the end of the outer casing and retaining the bottle between the spring and annular rim of the collar, and a cap threaded on the said annular collar and enclosing said nipple.

THEODORE BAILEY.

REFERENCES CITED

The following references are of record in the file of this patent:

UNITED STATES PATENTS

| Number | Name | Date |
|---|---|---|
| 922,413 | Friedrich | May 18, 1909 |
| 978,892 | Janssen | Dec. 20, 1910 |
| 995,700 | Maynard | June 20, 1911 |
| 1,121,349 | Goss | Dec. 15, 1914 |
| 1,418,268 | Alney | June 6, 1922 |
| 1,610,136 | Ketty | Dec. 7, 1926 |
| 1,706,034 | Moore | Mar. 19, 1929 |
| 1,749,432 | Kriege | Mar. 4, 1930 |
| 2,096,961 | Condon | Oct. 26, 1937 |
| 2,330,019 | Vaughn et al. | Sept. 21, 1943 |

FOREIGN PATENTS

| Number | Country | Date |
|---|---|---|
| 27,943 | Great Britain | Dec. 18, 1907 |